Patented Sept. 1, 1931

1,821,208

UNITED STATES PATENT OFFICE

HENRY W. DAHLBERG, OF DENVER, COLORADO

BARIUM SILICO-FERRITE AND PROCESS OF PREPARING THE SAME

No Drawing.   Application filed July 12, 1929. Serial No. 377,916.

This invention relates to the new material, barium silico-ferrite, more particularly the tetra-barium silico-ferrite and to a process of preparing the same.

One of the objects of the invention is to produce a cheap barium compound, which may either be used directly for many purposes, such as the purification of water, or which may be leached with water to produce barium hydroxide. The invention is based upon the following fundamental data, which show at what temperatures and under what conditions three distinct ferrites are formed, i. e., mono-barium ferrite, di-barium ferrite and tetra-barium ferrite.

When a mixture of barium carbonate and ferric oxide are heated to the required temperature carbon dioxide is driven off and definite compounds of the barium and ferric oxides are formed. These compounds are called barium ferrites.

The formation of at least three of these ferrites has been definitely established by determining their temperatures of formation. When a mixture of barium carbonate and ferric oxide containing six mols. of the former per mol. of the latter is heated in an atmosphere containing 9.5% $CO_2$ and about 4% water vapor, the barium carbonate starts to decompose at 685° C. If held at this temperature or at any higher temperature up to 885° C. one mol. and only one mol. of barium carbonate per mol. of ferric oxide will be decomposed. At 885° C. a second mol. of barium carbonate per mol. of ferric oxide decomposes. No more will decompose up to a temperature of 1085° C. At this temperature two more mols. of barium carbonate per mol. of ferric oxide decompose. These temperatures are correct to within ±10° C.

These data definitely prove the formation of mono-barium ferrite, $BaO.Fe_2O_3$, di-barium ferrite, $2BaO.Fe_2O_3$ and tetra barium ferrite, $4BaO.Fe_2O_3$. It is quite probable that ferrites of a higher molecular ratio are formed, but they are not formed below 1100° C.

The preferred method of preparing tetra-barium silico-ferrite is as follows:

A mixture is prepared of amounts of barium carbonate or witherite (natural barium carbonate), with substantially pure ferric oxide and silica, in amounts required to combine in molecular proportions to form tetra-barium silico-ferrite ($4BaO.Fe_2O_3.2BaO.SiO_2$), the percentage of $SiO_2$ in the product being held below 4%. The iron oxide may be either pure iron oxide, or a substantially pure iron oxide, such as flue dust from blast furnace operations. The advantage of this form of barium silico-ferrite is that it contains a high percentage of water soluble barium oxide, and can be leached without producing a slimy, non-settling insoluble residue which is difficult to handle with settling equipment. I prefer to limit the percentage of silica in the furnace product to 4%, as any larger quantities appreciably reduce the extraction of water soluble barium oxide. This 4% includes any silica contained in either the barium carbonate (witherite) or in the iron oxide.

The mixture of barium carbonate, iron oxide and silica should be reduced to a fineness of at least 100 mesh and may then be introduced into a furnace in dry or wet condition. The furnace should preferably be a rotary kiln, 140 to 160 feet long, heated with fuel oil or natural gas, and having a proper refractory lining consisting of "high alumina" fire brick. The furnacing is done at a maximum temperature of 1150° to 1250° C., until practically all of the carbon dioxide is driven off, and the definite compound tetra-barium silico-ferrite formed. It will be observed that no reducing agents are used and that all of the materials used enter into the final combination, the barium being directly combined with both the iron oxide and silica. The consumption of fuel oil in a furnace or rotary kiln of this size, run at normal capacity, is 12% to 14% of the weight of silico-ferrite product or clinker. The time required for complete conversion and for the elimination of carbon dioxide is one to three hours.

The furnace product is a hard, brown-red clinker, in the form of pellets of pea size or larger. When completely converted and not fused by excessive temperature, it reacts very vigorously with water, the pellets falling apart into small particles within a few minutes, with evolution of heat.

The following is a typical analysis of the preferred barium silico-ferrite:

| | Per cent |
|---|---|
| Acid soluble BaO | 77.91 |
| $Fe_2O_3$ | 12.32 |
| $SiO_2$ | 3.11 |
| $CO_2$ | 2.25 |
| Undetermined ($BaSO_4$, etc.) | 4.41 |
| | 100.00 |

Barium silico-ferrite, when thoroughly leached with hot water, produces reddish insoluble residue, in which the molecular ratio of BaO to $Fe_2O_3$, combined as barium ferrite, is always less than 1.

The present process is not limited to the production of exact tetra-barium silico-ferrite alone, as above specified or proportions $4BaO.Fe_2O_3.2BaO.SiO_2$, as it is commercially practicable to produce a furnace product containing more or less barium oxide than the formula above specified. It is desirable to vary the proportions of BaO, $Fe_2O_3$ and $SiO_2$ within reasonable limits to conform to the best operating conditions for any given furnace.

What I claim is:

1. As a new product of manufacture, a furnace product consisting chiefly of barium silico-ferrite.

2. As a new product of manufacture, a further product consisting chiefly of barium silico-ferrite, characterized by having a melting point above 1300° C.

3. As a new product of manufacture, barium silico-ferrite corresponding substantially to the formula $4BaO.Fe_2O_3.2BaO.SiO_2$.

4. The process of producing barium silico-ferrite, which process consists of treating a compound of barium and an acidic oxide, and the acidic oxide of which is capable of being volatilized, by heating it in the presence of substantially pure iron oxide and a small percentage of silica, in a furnace at a temperature of at least 1100° C., thus producing barium silico-ferrite in a single step.

5. The process of producing barium silico-ferrite, which process consists in heating to a temperature of at least 1100° C. a mixture consisting of barium carbonate, iron oxide and silica, in a furnace and thus producing barium silico-ferrite in a single step.

6. The process of producing barium silico-ferrite, which process consists in heating to a temperature of at least 1100° C. a mixture consisting of barium carbonate, iron oxide and silica, in a furnace and driving off carbon dioxide, thus producing barium silico-ferrite in a single step.

7. The process of producing barium salts, which consists in heating a barium salt having a volatilizable acid radical, to at least 1100° C. in the presence of iron oxide and silica.

8. The process of producing a furnace product consisting chiefly of barium silico-ferrite, which process consists in heating in a furnace at a temperature of at least 1100° C. a mixture of a barium salt having a volatilizable acid radical, iron oxide and silica.

9. The process of producing barium silico-ferrite, which process consists of treating a compound, which compound includes a combination of barium with an acidic oxide capable of being volatilized by heating it in the presence of substantially pure iron oxide and a small percentage of silica at a temperature of at least 1100° C., and thus producing barium silico-ferrite in a single step.

In testimony whereof I affix my signature.

HENRY W. DAHLBERG.